July 18, 1967  JEAN-CLAUDE CHARRAULT ET AL  3,331,608
TIGHTNESS JOINT FOR SHAFT WITH LIQUID SEALING MEDIUM
SOLIDIFYING AT AMBIENT TEMPERATURE
Filed March 12, 1964                                    2 Sheets-Sheet 2

INVENTORS
Jean-Claude CHARRAULT
Paul COGEZ
Lino GUIDUCCI
BY
ATTORNEYS

United States Patent Office 3,331,608
Patented July 18, 1967

3,331,608
TIGHTNESS JOINT FOR SHAFT WITH LIQUID SEALING MEDIUM SOLIDIFYING AT AMBIENT TEMPERATURE
Jean-Claude Charrault, Brussels, Belgium, Paul Cogez, Montrouge, France, and Lino Guiducci, Leval, Belgium, assignors to European Atomic Energy Community—Euratom, Brussels, Belgium
Filed Mar. 12, 1964, Ser. No. 367,910
Claims priority, application Belgium, Mar. 13, 1963, 503,803, Patent 629,555
1 Claim. (Cl. 277—16)

The present invention relates to a tightness joint the operation of which depends on a change in the physical state of the packing material used. This type of joint may be used either for a static connection or for a sliding or rotating connection.

Such joints which are based on a change in the physical state, generally the passage from the liquid state to the solid state, are already known and disclosed, for instance, in U.S. Patents Nos. 1,882,757 to J. E. Boynton and 2,799,522 to E. C. King and V. K. Heckel.

The present invention is an improvement of this type of joints which makes the construction thereof easier and the operaton much more simple and efficient, particularly in the case of a tightness problem involving a fluid medium which solidifies at ambient temperature. The invention finds particular use, although not exclusively so, in nuclear reactors, cooled by an organic liquid such as a mixture of terphenyls, for instance.

According to the invention, a tightness joint between two elements capable of moving one within the other in the presence of a fluid medium solidifyng at ambent temperautre, the fluid medium acting as packing material between the elements, one of said elements being stationary and the other being movable, is characterized in that it comprises a thin metallic partition completely surrounding the stationary element and having an external outer outline defining at least one undulation, a rigid sheet which with said stationary element defines an enclosure for circulating a cooling fluid in an area of said stationary element in contact with said partition, and means securing said partition to said movable element, said partition being also in sliding contact with said sheet on said stationary element when the said elements are displaced relative to one another.

According to another feature, the metallic partition is formed with a plurality of undulations or ripples due to the presence of continuous helicoidal grooves in the surfaces of the partition with such a winding direction that it forces the cooling fluid into a path which favourizes heat exchange with the fluid medium solidifying at ambient temperature.

The helicoidal grooves may be triangular, square, trapezoidal, circular, etc. in cross-section according to the form which is best suited to the physical characteristics of the fluid medium which constitutes the packing material: viscosity, fluidity, etc.

The coolant circulates in contact with one of the faces of the partition and causes solidification of the fluid medium (generally a liquid) on the other face in a certain number of threads of the corresponding helicoidal groove. The other threads, located downstream constitute a securety and act as raking segments particularly in the case of a sliding passage.

Amongst the advantages provided by a joint made according to the invention, it is appropriate to insist on the fact that the manufacture thereof does not necessitate any accurate machining tolerance, the joint has a reduced volume, and limits friction to the only threads used for the solidification of the packing material. The said friction can besides be reduced according to the shape of the cross-section of the grooves, their pitch and depth and the rate of flow of the coolant.

Other features of the invention will point to further advantages of the proposed joint which will become apparent from the following description of a preferred embodiment of the invention, having reference to the appending drawing wherein.

Only those elements necessary for the understanding of the invention have been shown in the drawing, like elements in the figures carrying the same reference numerals.

Figure 1:
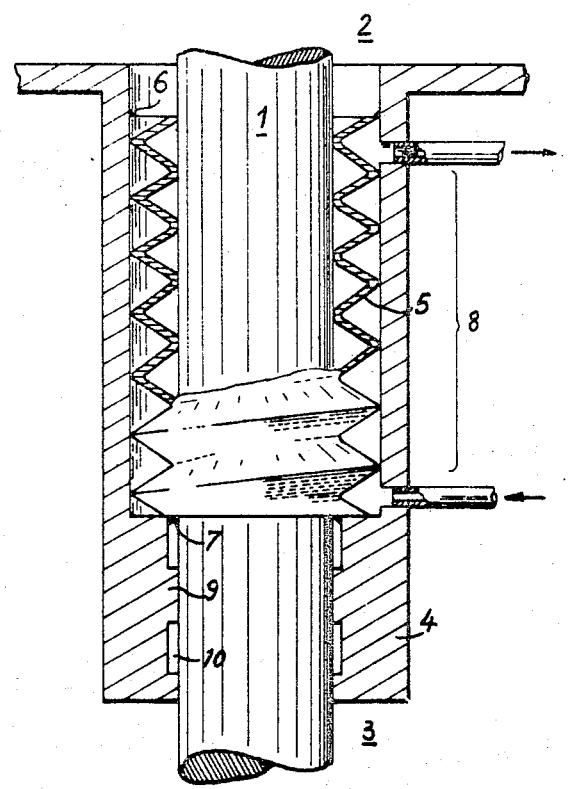
FIG. 1 is an axial cross-section half view of a joint made according to the invention.
Figure 2:
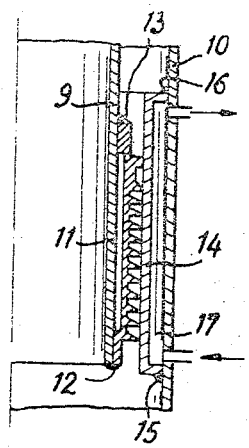
FIG. 2 is an axial cross-section half view of another embodiment of the invention.

FIG. 1 illustrates a metallic shaft 1 immersed on one side in a fluid medium 2 and, on the other side, exposed to atmosphere 3. Medium 2 is of such a nature that it solidifies at ambient temperature: it is for instance, an organic liquid such as a mixture of terphenyls, used as coolant in a nuclear reactor.

In accordance with the invention, a thin metallic partition 5 is provided between shaft 1 and its cylindrical passage 4; this partition which is welded to passage 4 along circles 6 and 7 has external helicoidal surfaces formed in such a way that the surface facing shaft 1 is slightly in contact therewith.

A circuit 8 for a refrigerant at ambient temperature such as water, for instance, is provided between partition 5 and passage 4. Eventually, projections or circular grooves such as and and 10 formed on the cylindrical passage or on the shaft provide an added safety for the tightness of the joint.

Operation of this type of joint can easily be derived from the preceding description: when liquid 2 tends to flow outwardly along shaft 1, inside helicoidal grooves of the partition 5, it is cooled and solidified by heat exchange with the coolant in circuit 8. In view of its character, it does not however adhere to shaft 1 and allows it to slide or rotate about its axis.

Merely as information, it may be pointed out that a joint of this type had been used on a shaft having a diameter of 30 mm. with terphenyl at 430° C., under a pressure of $5.10^5$ and of $30.10^5$ Pa ($10^5$ Pa $\#$ 1 kg./cm$^2$), without causing any leak. The flow rate of the coolant was between 0 and 0.8 l./m.; which is a rather low value. The temperature in the shaft did not go over 75° C. and, in the neighborhood of the packing, 55° C. without cooling and 30° C. with a rate of 0.8 l./min. The maximum force necessary to start the shaft moving is 700 kg.; practically no force will be necessary thereafter to cause its displacement (friction being negligible).

FIGS. 2 to 5 illustrate other embodiments wherein shaft 1 is replaced by a metallic tube 9 capable of movement as, for instance, by expanding longitudinally inside a stationary sheath 10. In order to obtain tightness, as in the preceding example, between the two elements in relation to a liquid which solidifies at ambient temperature, a thin metallic partition 11 having a helicoidal profile is secured to the movable part 9, for instance by means of two circular welding strips 12 and 13. This partition is in sliding contact with a cylindrical sheet 14 welded to the stationary part 10 by welding strips 15, 16 and inside which a cooler 17 circulates.

Figure 3:
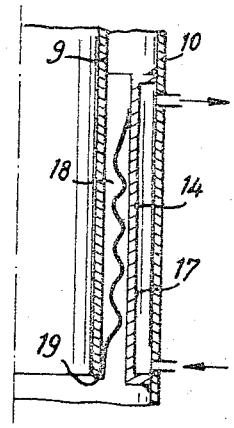
FIG. 3 is an axial cross-section half view of a modification of the joint illustrated in FIG. 2 wherein securement of the partition is provided only along one circle.

In the embodiment illustrated in FIG. 3, partition wall 18 is secured to the movable part only along circular strip 19: the partition is sufficiently resilient to firmly abut against the cooled cylindrical sheet 14.

Figure 4:
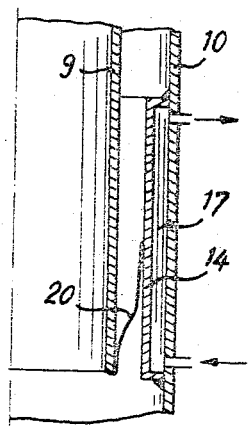
FIGS. 4 and 5 are half views in axial cross-section of another embodiment of the invention wherein the partition only has one peripheral undulation.
Figure 5:
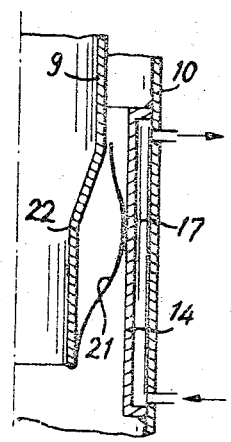

FIGS. 4 and 5 illustrate still more simplified embodiments of the same joint: the thin metallic partition 20 or 21 has only one peripheral undulation; the end of movable part 9 may be cylindrical and of constant diameter as in FIG. 4 or slightly restricted as at 22 on FIG. 5.

It is to be understood that the invention is not to be limited to the embodiments described above as examples only but that it should embrace all other possible embodiments within the spirit of the invention; thus, the safety projection grooves 7 and 8 of FIG. 1 could also be cooled by the refrigerant in circuit 8.

We claim:

In a joint between elements movable one within the other in the presence of a fluid medium which solidifies at room temperature, one of said elements being stationary and the other being movable, said fluid medium acting as packing material between said elements, the combination comprising a thin metallic partition completely surrounding said stationary element and having an external outer outline defining at least one undulation, a rigid sheet, which with said stationary element, defines an enclosure for circulating a cooling fluid in an area of said stationary element in contact with said partition, and means securing said partition to said movable element, said partition being also in sliding contact with said sheet on said stationary element when the said elements are displaced relative to one another.

References Cited

UNITED STATES PATENTS

| | | | |
|---|---|---|---|
| 1,882,757 | 10/1932 | Boynton | 277—1 XR |
| 2,646,065 | 7/1953 | Tyson | 277—1 XR |
| 2,799,522 | 7/1957 | King et al. | 277—16 |
| 3,117,792 | 1/1964 | Glenn et al. | 277—22 |

FOREIGN PATENTS 629,082   9/1963   Belgium.

SAMUEL ROTHBERG, *Primary Examiner.*